United States Patent
Shaw et al.

(10) Patent No.: US 7,444,681 B2
(45) Date of Patent: Oct. 28, 2008

(54) SECURITY MEASURES IN A PARTITIONABLE COMPUTING SYSTEM

(75) Inventors: Mark Edward Shaw, Garland, TX (US); Vipul Gandhi, Livingston, NJ (US); Gregg Bernard Lesartre, Ft. Collins, CO (US); Brendan A. Voge, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 758 days.

(21) Appl. No.: 10/756,473

(22) Filed: Jan. 12, 2004

(65) Prior Publication Data
US 2005/0198522 A1 Sep. 8, 2005

(51) Int. Cl.
*H04L 9/32* (2006.01)

(52) U.S. Cl. ............................................. 726/27; 726/2
(58) Field of Classification Search ................. 726/1–2, 726/14, 27, 30; 713/168–170
See application file for complete search history.

(56) References Cited

U.S. PATENT DOCUMENTS

| | | | | |
|---|---|---|---|---|
| 5,659,542 | A * | 8/1997 | Bell et al. | 370/496 |
| 6,622,265 | B1 * | 9/2003 | Gavin | 714/38 |
| 7,136,904 | B2 * | 11/2006 | Bartek et al. | 709/217 |
| 2005/0055595 | A1 * | 3/2005 | Frazer et al. | 713/400 |

* cited by examiner

*Primary Examiner*—Hosuk Song

(57) ABSTRACT

Methods and apparatus in a partitionable computing system. A first link controller is associated with a first partition. A second link controller is associated with a second partition. A computing element communicated with link controllers to establish or deny communication between the partitions.

19 Claims, 15 Drawing Sheets

SECURITY MEASURES IN A PARTITIONABLE COMPUTING SYSTEM

FIELD OF THE INVENTION

The invention relates to the field of partitionable computing systems and more specifically to protecting partitions within a partitionable computing system.

BACKGROUND OF THE INVENTION

An example of a scaleable computing solution is a partitionable computing system. In such a system a number of elements (e.g., computing cells) can be combined into a partition that is dedicated to perform a specific computing function. Multiple partitions can exist in the same partitionable computing system, each having a specific function. A malicious attack on one partition could result in the entire partitionable system being compromised.

SUMMARY

Systems, methods, hardware, software, firmware, media, and computer instructions are described herein below that provide security among partitions of a partitionable computing system. In one embodiment, the system includes a first link controller, a second link controller, and computing element. The first link controller can be associated with a first partition. The second link controller can be associated with the second partition. The computing element can be configured to request the establishment of the communications link between the first and second partitions.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown. The drawings are not necessarily to scale, emphasis instead being placed on illustrating the principles of the present invention.

DETAILED DESCRIPTION

Figure 1B:
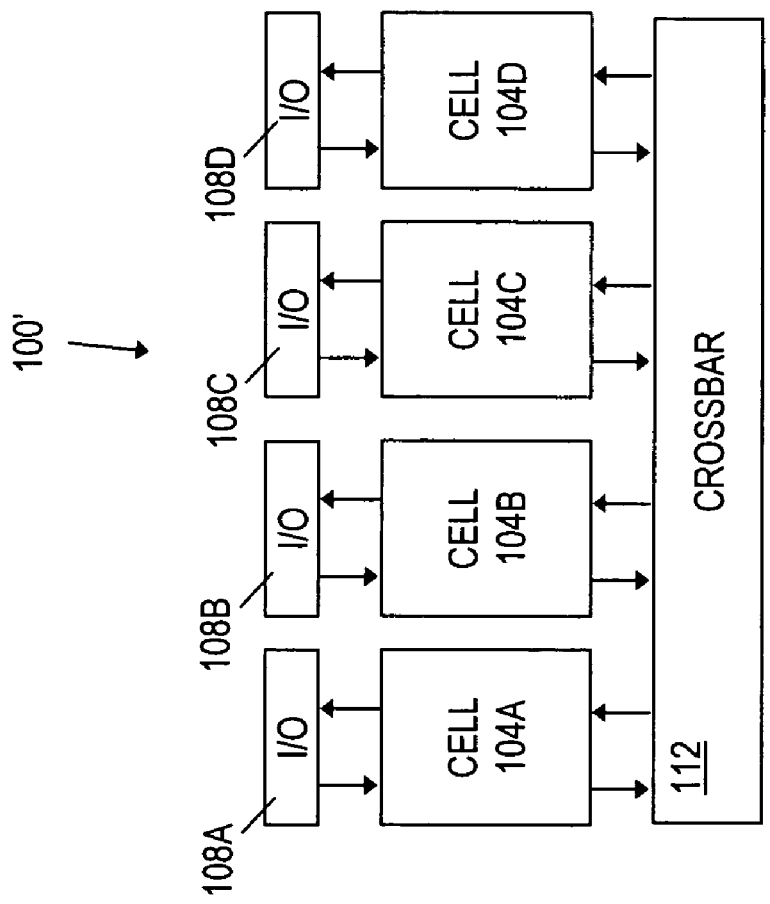
FIGS. 1A, 1B, and 1C are block diagrams of various partitionable computing systems constructed in accordance with the principles of the invention.
Figure 1A:
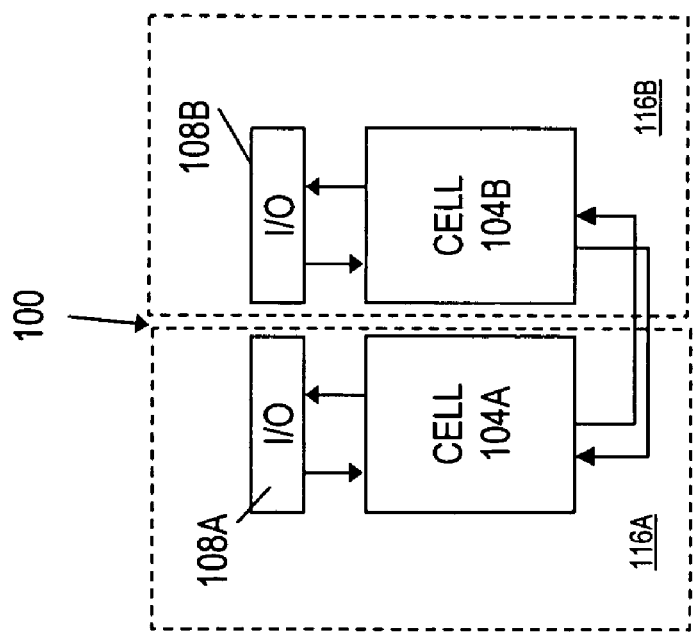
Figure 1C:
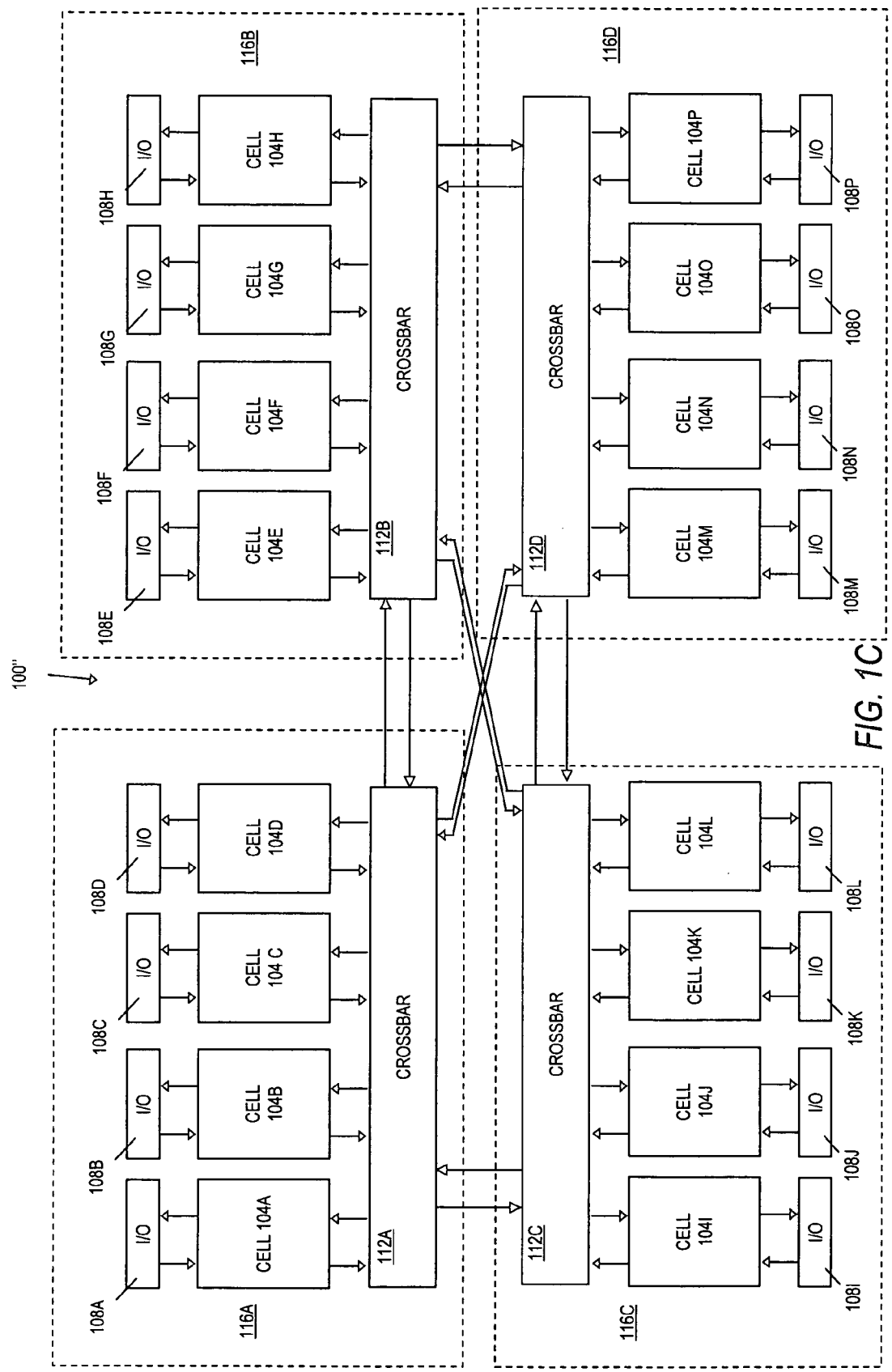

With reference to FIGS. 1A, 1B, and 1C, a partitionable computing system 100 can include a number of elements or cells 104. In FIG. 1A, only two cells 104A and 104B are present. However, more than two cells 104 can create the partitionable computing system 100. For example, FIG. 1B depicts a partitionable computing system 100' having four cells 104A, 104B, 104C, and 104D. In FIG. 1C, sixteen cells 104A, 104B, 104C, 104D, 104E, . . . 104P, create the partitionable computing system 100". Each cell 104 can communicate with a respective input and output module 108, which is used to provide input to the system 100 and output from the system 100.

In partitionable computing systems having more than two cells 104, for example systems 100' and 100" shown in FIGS. 1B and 1C, respectively, the cells 104 can communicate with each other through a routing device 112. The routing device can be a crossbar switch or other similar device that can route data packets. For example, a NUMAflex 8-Port Router Interconnect Module sold by SGI of Mountain View, Calif. can be used. The routing device 112 facilitates the transfer of packets from a source address to a destination address. For example, if cell 104A sends a packet to cell 104D, cell 104A sends the packet to the routing device 112, the routing device 112 in turn, transmits the packet to cell 104D.

In a larger partitionable computing system, such as the system 100" shown in FIG. 1C, there can be more than one routing device 112. For example, there can be four routing devices 112A, 112B, 112C, and 112D. The routing devices 112 collectively can be referred to as the switch fabric. The routing devices 112 can communicate with each other and a number of cells 104. For example, cell 104A, cell 104B, cell 104C and cell 104D can communicate directly with routing device 112A. Cell 104E, cell 104F, cell 104G, and cell 104H can communicate directly with routing device 112B. Cell 104I, cell 104J, cell 104K, and cell 104L can communicate directly with routing device 112C. Cell 104M, cell 104N, cell 104O, and cell 104P can communicate directly with routing device 112D. In such a configuration, each routing device 112 and the cells 104 that the routing device 112 directly communicates with can be considered a partition 116. As shown, in FIG. 1C there are four partitions 116A, 116B, 116C and 116D. As shown, each partition includes four cells, however; any number of cells and combination of cells can be used to create a partition. For example, partitions 116A and 116B can be combined to form one partition having eight cells. In one embodiment, each cell 104 is a partition 116. As shown in FIG. 1A, cell 104 can be a partition 116A and cell 104B can be a partition 116B.

Each partition can be dedicated to perform a specific computing function. For example, partition 116A can be dedicated to providing web pages by functioning as a web server farm and partition 116B can be configured to provide diagnostic capabilities. In addition, a partition can be dedicated to maintaining a database. In one embodiment, a commercial data center can have three tiers of partitions, the access tier (e.g., a web farm), application tier (i.e., a tier that takes web requests and turns them into database queries and then responds to the web request) and a database tier that tracks various action and items.

Figure 2:
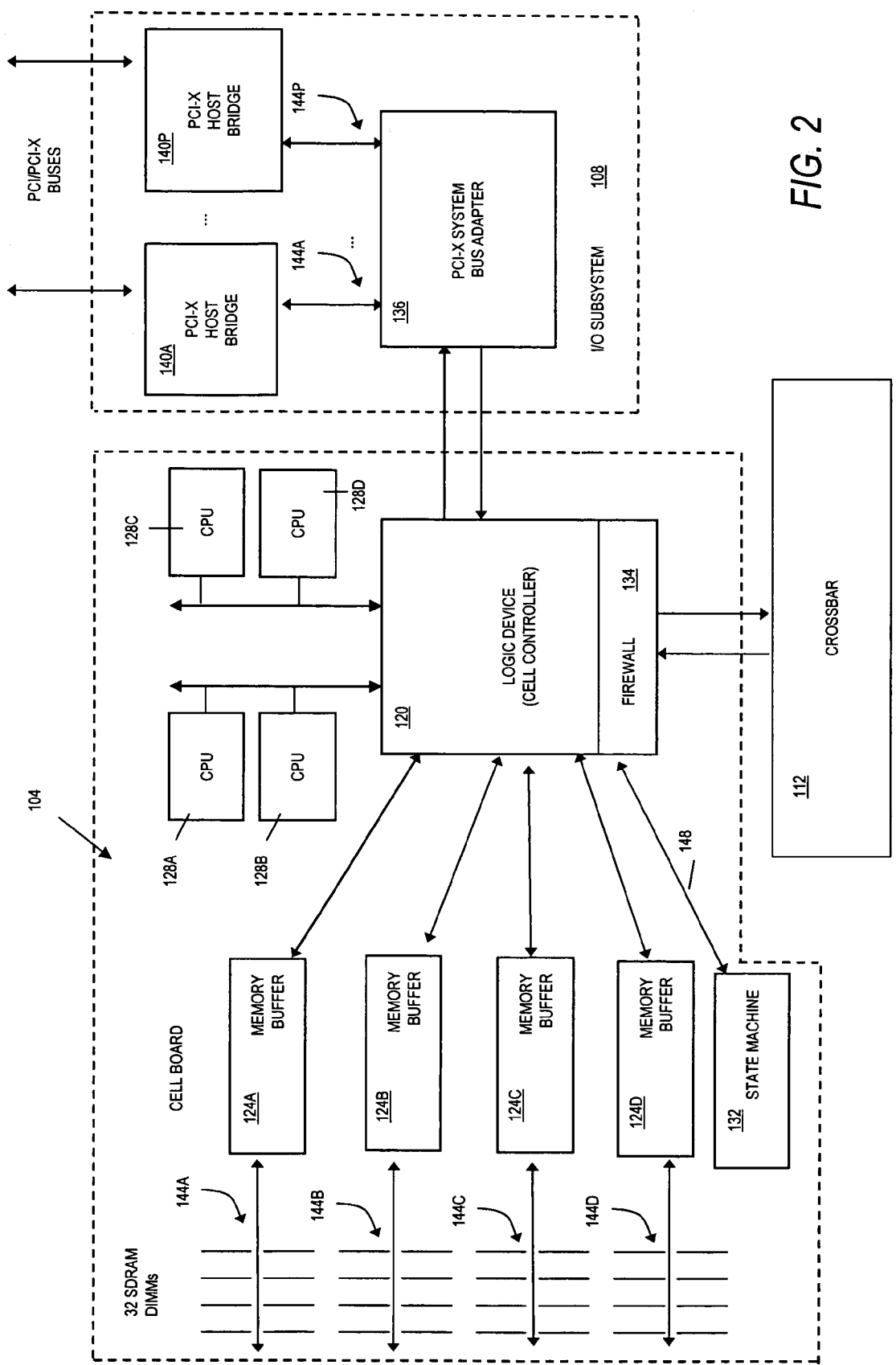
FIG. 2 is a block diagram of a cell of FIG. 1B constructed according the principles of the invention.

With reference to FIG. 2, each cell 104 includes a logic device 120, a plurality of memory buffers 124A, 124B, 124C, 124D (referred to generally as memory buffers 124), a plurality of central processing units (CPUs) 128A, 128B, 128C, 128D (referred to generally as CPUs 128), a state machine 132, and a firewall 134. The term CPU is not intended to be limited to a microprocessor, instead it is intended to be used to refer to any device that is capable of processing. The memory buffers 124, CPUs 128, and state machine 132 each communicate with the logic device 120. When the cell 104 is in communication with a crossbar 112, the logic device 120 is also in communication with the crossbar 112. The logic device 120 is also in communication with the I/O subsystem 108. The logic device 120 can be a field programmable gate array (FPGA) 132. The logic device 120 is also be referred to as the cell controller 120 through the specification. The logic device 120 includes a communications bus (not shown) that is used to route signals between the state machine 132, the CPUs 128, the memory buffers 124, the routing device 112 and the I/O subsystem 108. The cell controller 120 also performs logic operations such as mapping main memory requests into memory DIMM requests to access and return data and perform cache coherency functions for main memory requests so that the CPU and I/O caches are always consistent and never stale.

In one embodiment, the I/O subsystem 108 include a bus adapter 136 and a plurality of host bridges 140. The bus adapter 136 communicates with the host bridges 140 through a plurality of communication links 144. Each link 144 connects one host bridge 140 to the bus adapter 136. As an example, the bus adapter 136 can be a peripheral component interconnect (PCI) bus adapter. The I/O subsystem can include sixteen host bridges 140A, 140B, 140C, ..., 140P and sixteen communication links 144A, 144B, 144C, ..., 144P.

As shown, the cell 104 includes fours CPUs 128, however; each cell includes various numbers of processing units 128. In one embodiment, the CPUs are ITANIUM based CPUs, which are manufactured by Intel of Santa Clara, Calif. Alternatively, SUN UltraSparc processors, IBM power processors, or Intel Pentium processors could be used. The memory buffers 124 communicate with eight synchronous dynamic random access memory (SDRAM) dual in line memory modules (DIMMs) 144, although other types of memory can be used.

The state machine 132 communicates with the logic device 120 via a communication path 148. The communications path 148 can be a single wire or a plurality of wires. Other types of communications paths can also be used such as a parallel communication bus or a serial communication bus. Although shown as part of the cell 104, the state machine can reside elsewhere in the partitionable computing system 100. The state machine 132 can be a combination of a register (not shown), a CPU 128, the logic device 120, and a set of computer readable instructions (not shown) that are read by the processor 128. The state machine 132 monitors the security status of one or more of the CPUs 128 or the partition 116 as a whole. The state machine 132 can determine whether or not the processor 128 or partition 116 is operating in a secure state or an unsecure state. As used herein the term secure means that the processor is in a state where it is executing trusted software that has been identified and authenticated to perform intended system functions that will not maliciously harm or change the system. As used herein the term unsecure state means not operating in the secure state. In addition to providing a secure versus unsecure status, the state machine 132 can provide various levels of security status. For example, high secure, low secure, and unsecure status can be used in the present system as well as many other status schemes. The status of the partition 116 can be stored in the register of the state machine 132. The register can be a single bit register or various other size registers. The stored security status is referred to as security status information and is used by various portions of the partitionable computing system 100. The security status information can be communicated to other portions of the partitionable computing system 100. The security status information provided by the state machine 132 can be used to control access to certain registers (not shown), certain pieces of authenticated computer readable instructions (e.g., firmware), and the I/O subsystem 108 of the partitionable computing system 100. It is desirable to control access to the registers and authenticated code in order to prevent a malicious user (e.g., a hacker) from damaging the operation of the partitionable computing system 100.

Although shown as a specific configuration, a cell 104 is not limited to such a configuration. For example, the I/O subsystem 108 can be in communication with routing device 112. Similarly, the DIMM modules 144 can be in communication with the routing device 112. The configuration of the components of FIG. 2 is not intended to limited in any way by the description provided.

Figure 3:
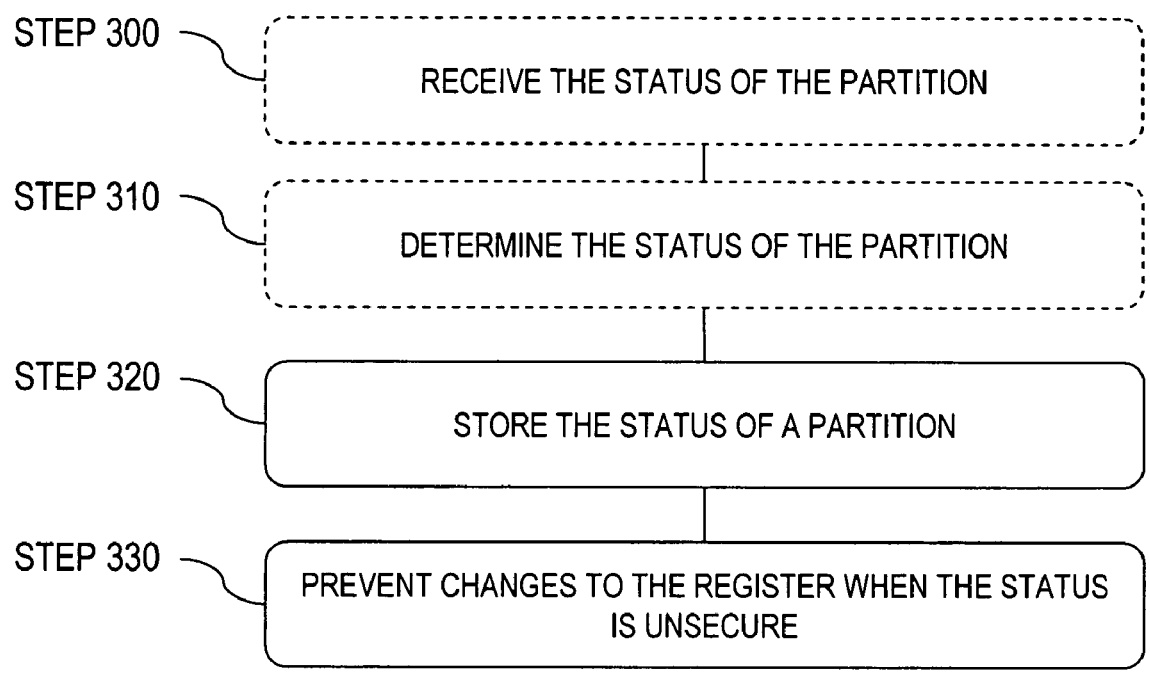
FIG. 3 is a flow chart showing various steps performed by the systems of FIGS. 1A, 1B, and 1C according to the principles of the invention

With reference to FIG. 3, in operation the state machine 132 can receive the security status information (i.e., secure or unsecure) related to the specific partition 116 or processor 128 the partitionable computing system 100 (STEP 300). Alternatively, the state machine 132 can determine the security status information (STEP 310). The state machine 132 can monitor the set of instructions being executed by the processor 128. For example, if the processor 128 is executing a known set of authenticated code, such as a set of system firmware instructions executed during the boot or reboot processes or instructions from an authenticated memory location (e.g., read only memory [ROM]), then the state machine determines the partition 116 is operating in the secure mode. However, if the processor is executing a set of non-authenticated instructions (e.g., operating system instructions or divers and applications installed or downloaded by a user) the state machine determines that that the partition 116 is operating in the unsecure mode. Various other methods can also be used to determine the security status information. For example, a lock and key hardware system can be used to determine whether or not the partition 116 or processor 128 is operating in a secure state. Also, an authentication process or algorithm can be used to determine the security status information. The security status information is stored (STEP 320). The security status information can be stored in a register of the partitionable computing system 100. The stored security status information can be used in a variety of ways to provide further protection for the partitionable computing system 100. For example, the security status information can be used as the firewall 134 to prevent access to the registers within the logic device 120.

Figure 4A:
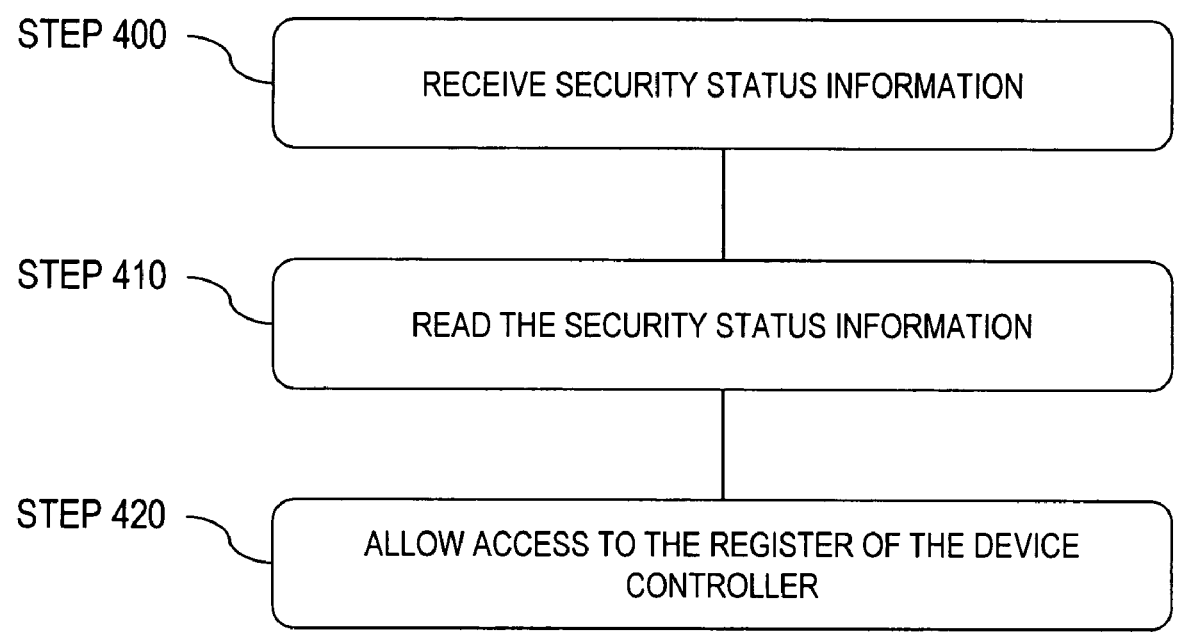
FIGS. 4A and 4B are flow charts showing various steps performed by the systems of FIGS. 1A, 1B, and 1C according to the principles of the invention.
Figure 4B:
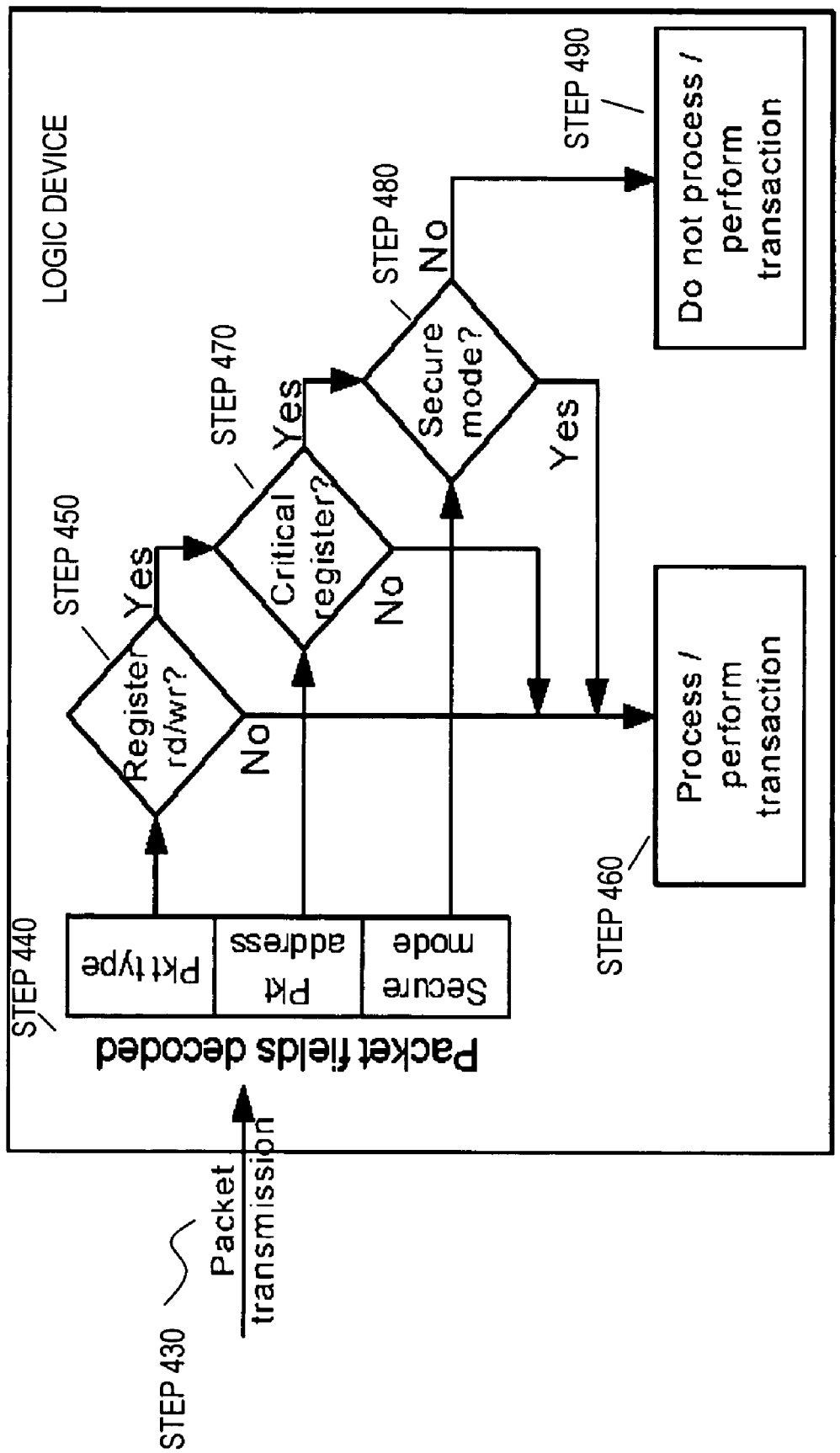

With reference to FIG. 4A, the logic device 120 receives the security status information from the state machine 132 via the communication path 148 (STEP 400). The logic device reads the security status information (STEP 410). The communication bus within the logic device 120 routes the security status information to the registers within the logic device 120. Access to the secure registers within the logic device 120 is granted when the security status information indicates that the partition 116 or processor 128 is operating in the secure mode (STEP 420). More specifically, with reference to FIG. 4B the security status information packet is transmitted to the logic device 120 (STEP 430). The logic device 120 decodes the fields of the security status information packet (STEP 440) to determine the packet type, the packet destination address, and security status information. The logic device 120 determines if the packet type indicates that a read or write operation is to be performed (STEP 450). If a read or write is not going to be performed, then the operation requested in the packet is processed or performed (STEP 460). If a read or write operation is to be performed, the logic device 120 determines if the read or write command is to a critical register (STEP 470). If the read or write command is not issued for a critical register, the operation requested in the packet is performed (STEP 460). However, if the read or write request is for a critical register the logic device 120 reads the security status information contained in the packet (STEP 480). If the security status information indicates the partition 116 or processor 128 is in the secure mode, the operation requested in the packet is processed (STEP 460). However, if the security status information indicates that the processor 128 or partition 116 is in the unsecure mode the logic device does not perform the operation requested in the packet (490).

Although described as hardware, the functionality of the logic device 120 can be implemented with a processor and a set of computer readable instructions configured to receive the security status information, read the security status information, and allow or deny access to certain critical registers in response to the security status information. Also, a combination of hardware and software could be used to provide the above-described functionality.

Figure 5:
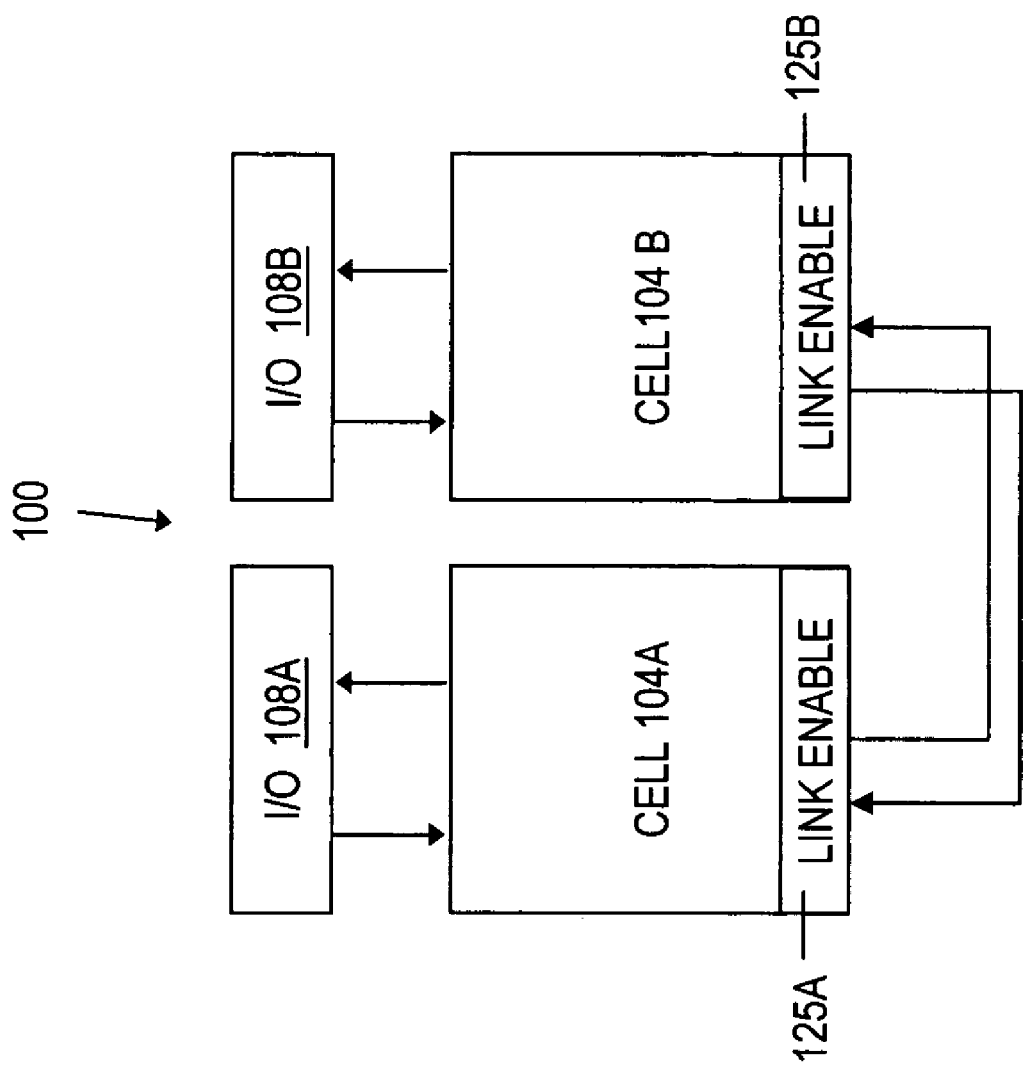
FIG. 5 is a block diagram showing an embodiment of the system of FIG. 1A according to the principles of the invention.

With reference to FIG. 1A and FIG. 5, in one configuration cell 104A communicates directly with cell 104B. In a two partition partitionable computing system 100, there is no crossbar 112 to facilitate communication between the cells 104. Typically in a two partition system, communication between cell 104A and cell 104B is not desired. As such, during the set up of the partitionable computing system 100 the communication link between cell 104A and 104B is not enabled. However, a malicious user could gain access to either cell 104A or cell 104B during the operation of the system 100. The malicious user could attempt to send packets to the other cell, thereby attempting to inhibit the operation of the system 100. To aid in preventing this situation each of the cells 104A and 104B include a link enable module 125A and 125B, respectively (referred to generally as link enable module 125). The link enable module 125 can be a register within the cell controller 120, which functions as a link controller in addition to the previous described functionality.

Figure 6:
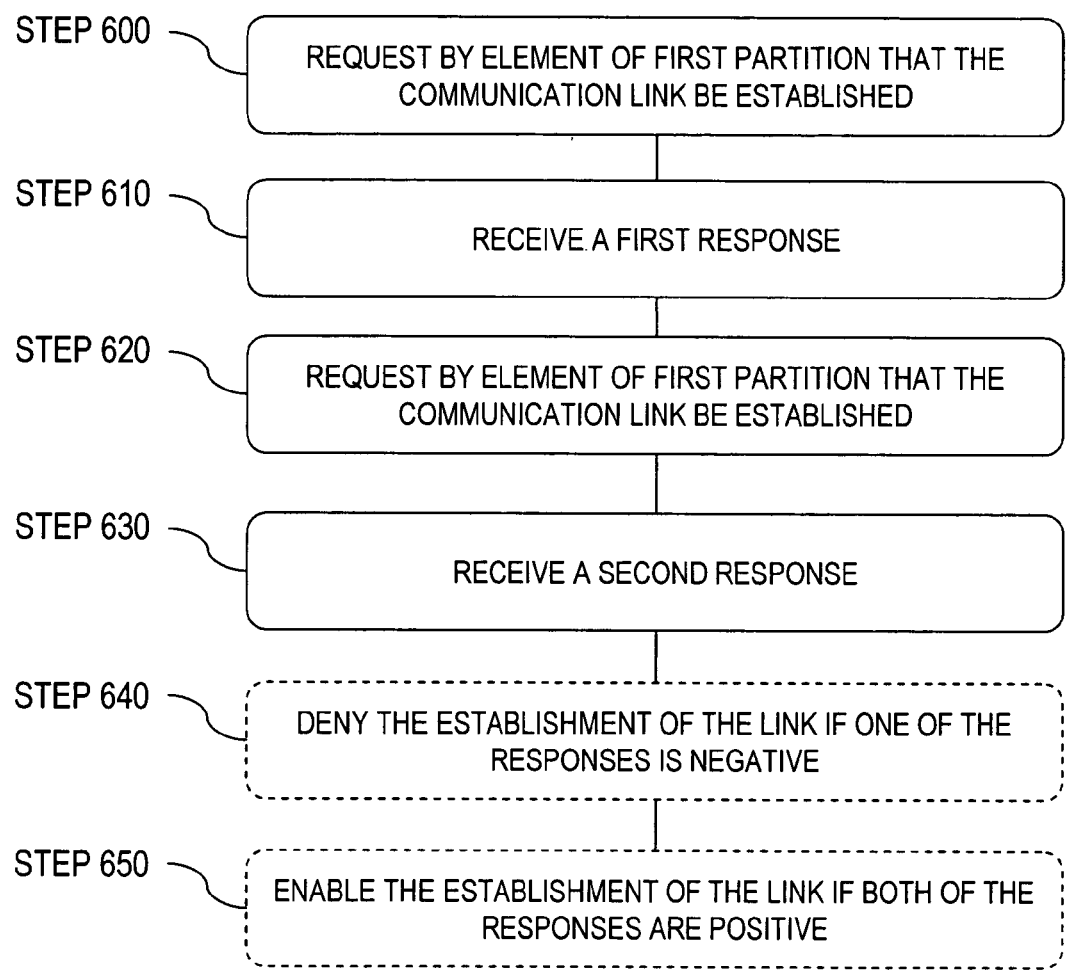
FIG. 6 is a flow chart showing various steps performed by the system of FIG. 5 according to the principles of the invention.

With reference to FIG. 6, if a communication link between cell 104A and cell 104B is to be established both partitions must enable the link. An element of cell 104A or cell 104B requests that the communication link between cell 104A and cell 104B be established (STEP 600). The request can come from a processor 128 of cell 104A, for example. The element receives a response from the link controller 120 (STEP 610). The response can be either positive, thereby indicating that the communication link can be established, or negative, thereby indicating that the communication link should not be established. The response can be written as a bit in the link enable register 125A. A request is sent by either an element of cell 104A or cell 104B to the link controller 120 of cell 104B (STEP 620). The element receives a response from cell 104B (STEP 630). The response can be either positive or negative. The response can be written as a bit to the link enable register 125B. The communication link is not established when the either response is negative (STEP 640). The communication link is established when both responses are positive (STEP 650). In other words, both cell 104A and cell 104B must indicate that establishing the communication link is permitted or communication between cell 104A and cell 104B is prohibited.

With reference to FIG. 1C, during the set-up of the partitionable computing system 100" each of the crossbars 112 is preprogrammed with a list of destination address that is can send packets to and receive packets from. For example, if one partition includes cells 104A through cell 104H crossbars 112A and 112B would be configured to transmit packets to each other. A routing table of crossbar 112A would include destination addresses for each cell 104 of the partition. In this example, the routing table would include addresses for cell 104A, 104B, 104C, 104D, 104E, 104F, 104G, and 104H. Crossbar 112B would also have a routing table that contains the same destination addresses. However, neither routing table would contain a destination addresses for cell 104I through 104P. Theses cells could be part of other partitions 116 of the partitionable computing system 100". Once the routing tables are configured, it is desirable to prevent unauthorized access to the routing tables. By preventing access to the routing tables unauthorized users are prevented from changing the configuration of the partitionable computing system 100".

Figure 7A:
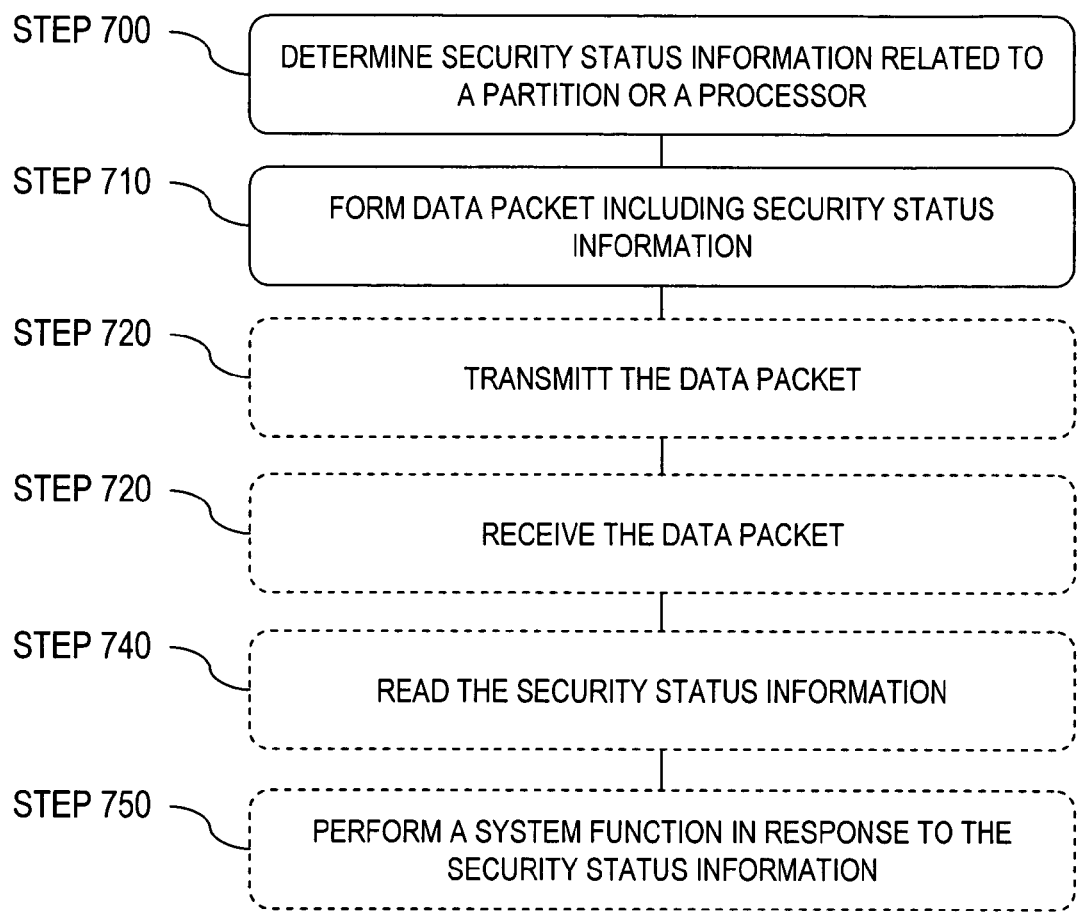
FIGS. 7A and 7B are flow charts showing various steps performed by the systems of FIGS. 1B and 1C according to the principles of the invention.

With reference to FIG. 7A, the security status of the partitionable computing system 100" is analyzed before a read or write operation can be performed on a routing table of the crossbar 112 or a critical register of the crossbar 112. The state machine 132 determines the security status of the partition 116 or processor 128 of the partitionable computing system 100" (STEP 700). The state machine communicates the security status information to a packet formation module, which is in communication the state machine and a processor 128. The packet formation module can be the logic device 120. The packet formation module forms the data packet that includes the security status information (STEP 710). The data packet can be formed by constructing the packet in pieces. For example, the packet can include a partial packet that includes the packet type (e.g., is the packet going to attempt to read or write to a register) and the destination address of the packet (e.g., is the register address for a critical register). The security status information can be appended to the partial packet. Once the packet is formed, a transmitter (not shown) transmits the data packet to the crossbar 112 (STEP 720) where the packet is received (STEP 730). The received packet is read by the crossbar (STEP 740) and a system function is performed in the response to the security status information (STEP 750).

Figure 7B:
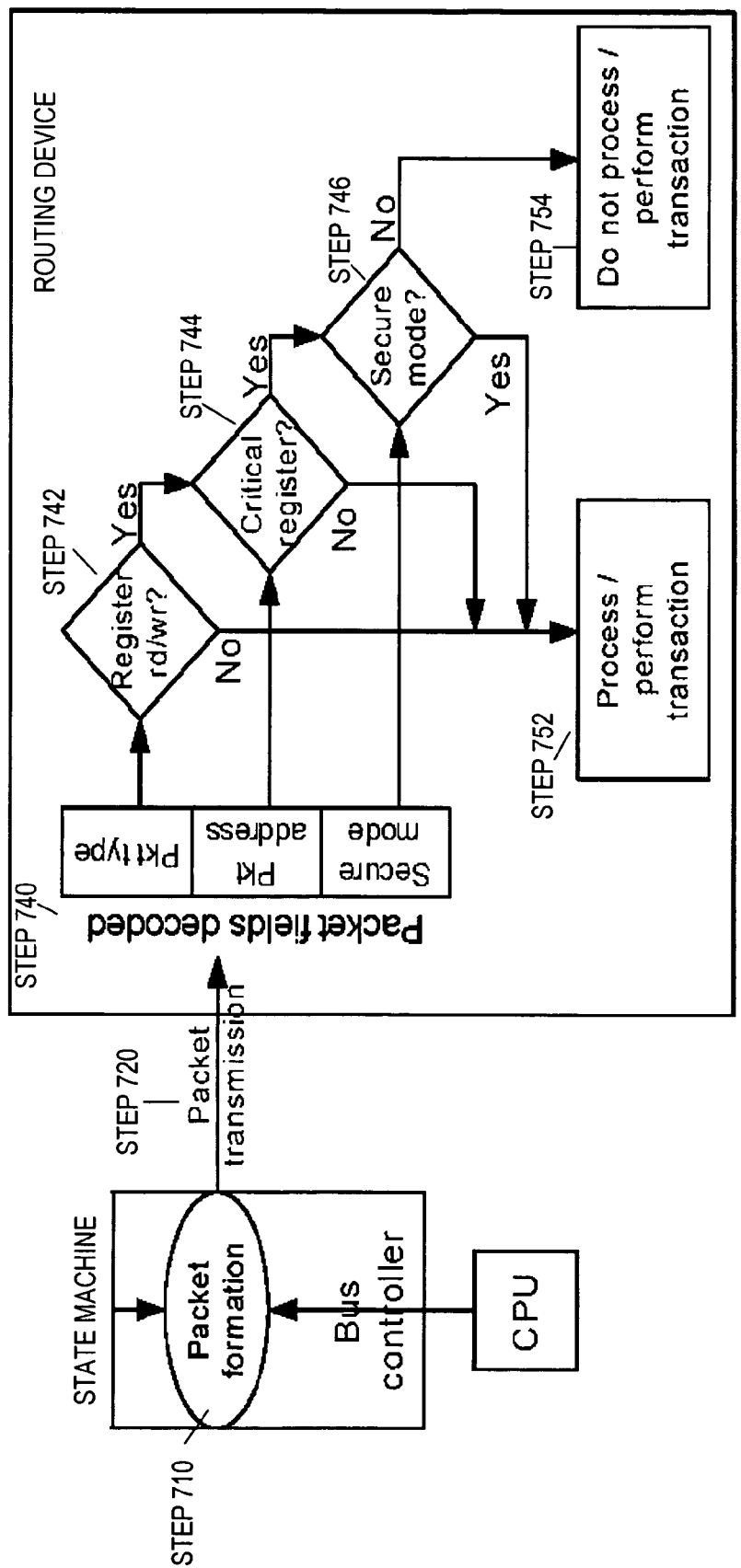

With reference to FIG. 7B, in more detail one of the CPUs 128, the logic device 120, and the state machine 132 cooperate to form a data packet that includes the packet type, the destination address, and the security status information (STEP 710). The CPU 128 and logic device cooperate to transmit the data packet to the crossbar 112 (STEP 720). The crossbar 112 receives the packet (STEP 730) and decodes (i.e., reads) the packet information (STEP 740). The crossbar 112 decodes the fields of the data packet to determine the packet type, the packet destination address, and security status information. The crossbar 112 determines if the packet type indicates that a read or write operation is going to be performed (STEP 742). If a read or write is not going to be performed, then the system function requested in the packet is processed or performed (STEP 752). If a read or write operation is to be performed, the crossbar 112 determines if the read or write command is to a critical register (STEP 744). If the read or write command is not issued for a critical register, the system function requested in the packet is performed (STEP 752). However, if the read or write request is for a critical register the crossbar 112 reads the security status information contained in the packet (STEP 746). If the security status information indicates the partition 116 or processor 128 is in the secure mode, the system function requested in the packet is processed (STEP 752). However, if the security status information indicates that the processor 128 or partition 116 is in the unsecure mode the logic device does not perform the operation requested in the packet (STEP 754). When the system function is not going to be performed, the crossbar 112 can respond in a number of ways. For example, the crossbar 112 can ignore the data packet. Alternatively, the crossbar 112 can respond to the data packet indicating the access to the register was denied.

Figure 8:
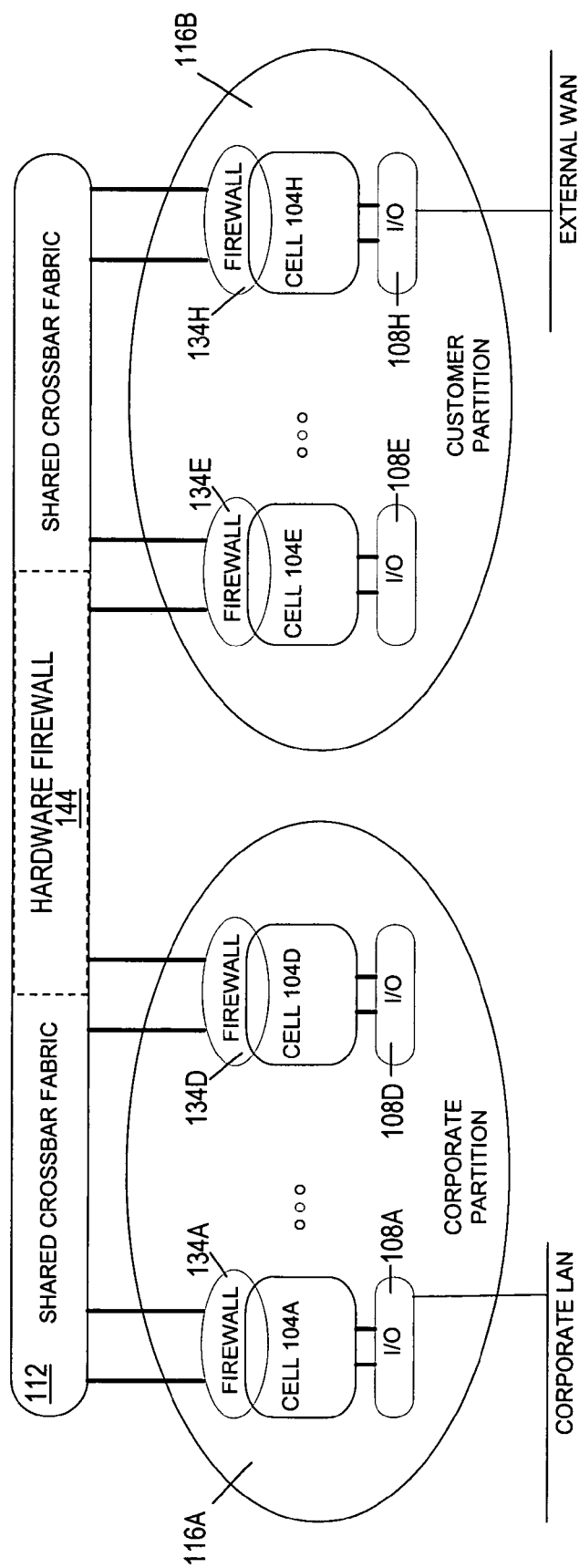
FIG. 8 is a block diagram showing an embodiment of a system constructed according to the principles of the invention.
Figure 9:
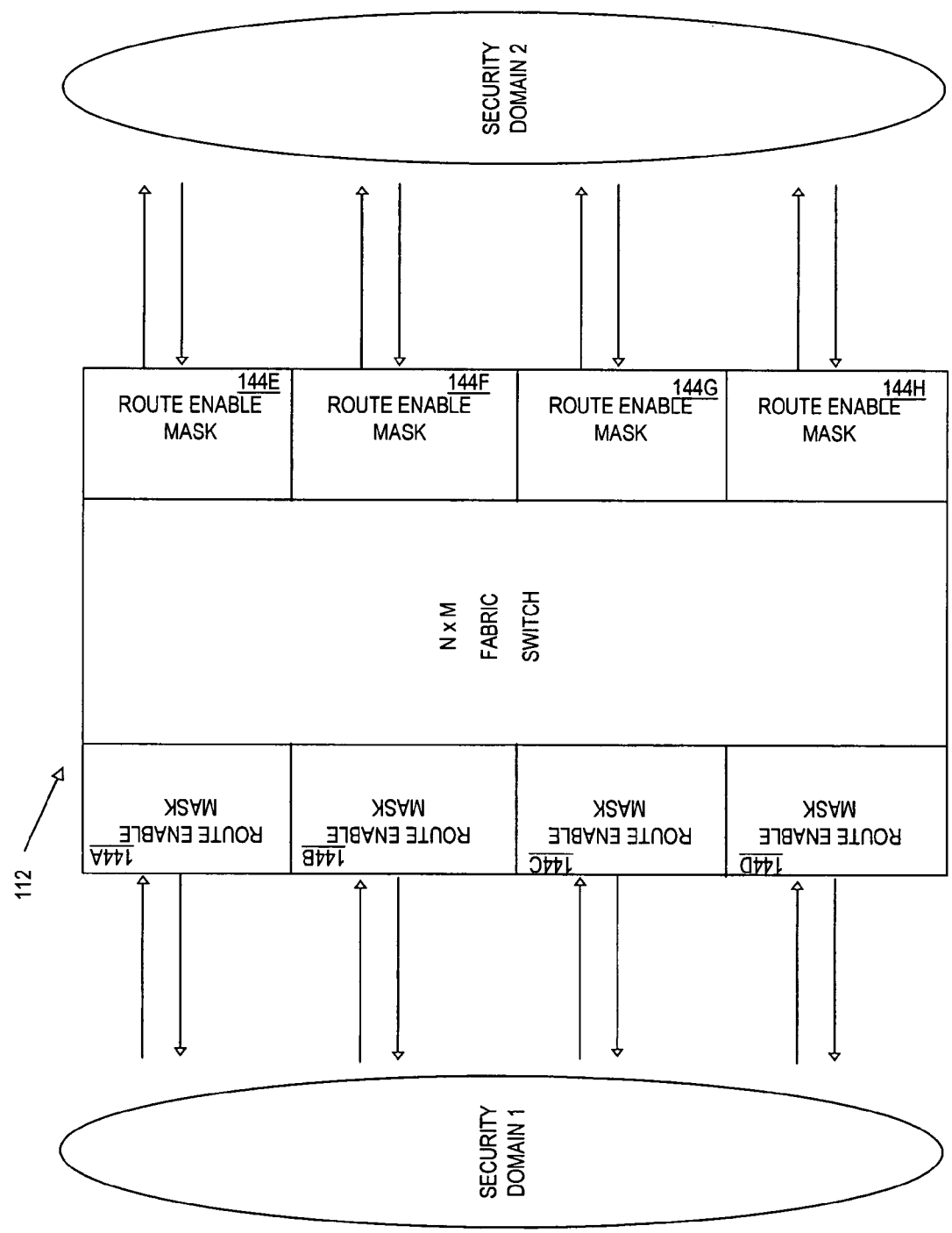
FIG. 9 is a block diagram of a routing device constructed according to the principles of the present invention.

In addition to preventing access to the routing tables of the routing devices 112 as described above, it is desirable to prevent packets from one partition (e.g., 116A) from being transmitted to another partition (e.g., 116C). With reference to FIG. 8, for example partition 116A can configured to perform financial transactions for a corporation and partition 116C can be configured to provide web hosting to customers of the corporation. If a malicious user gains access to partition 116C, it would be desirable to prevent the malicious user from sending harmful packets to the partition 116A and render it inoperable. With reference to FIG. 9, each routing device 112 can include a routing table or a route enable mask 144 that includes a plurality of authorized destination addresses. A route enable mask 144 can be associated with each port on an N×M fabric switch 112. In one embodiment, N and M can be the same value. Alternatively, N and M can be different values. The route enable mask functions as a firewall to prevent the transmission of unauthorized packets between partitions 116 of the partitionable computing system 100.

Figure 10:
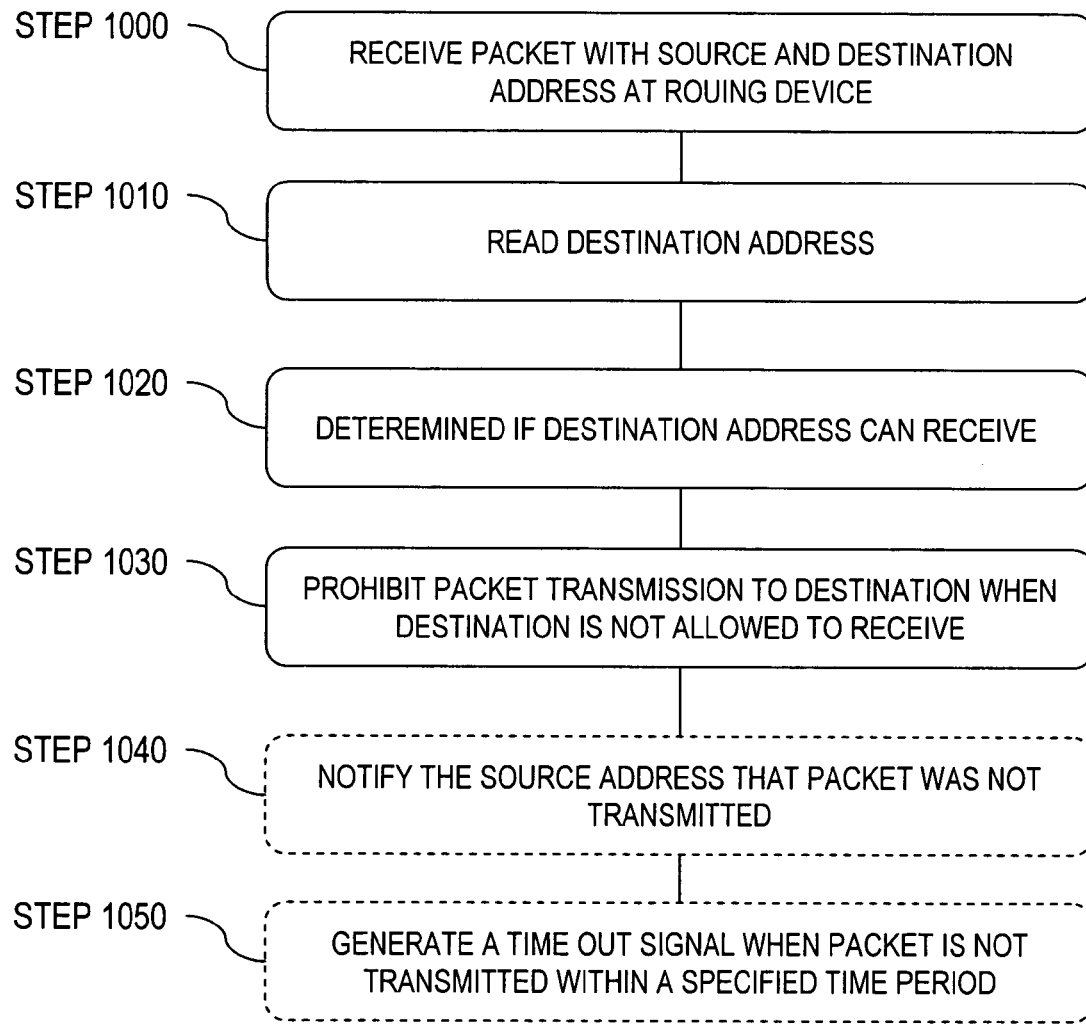
FIGS. 10, 11A, 11B, and 11C are flow charts showing various steps performed by the systems of FIGS. 1A, 1B, and 1C according to the principles of the invention.
Figure 11A:
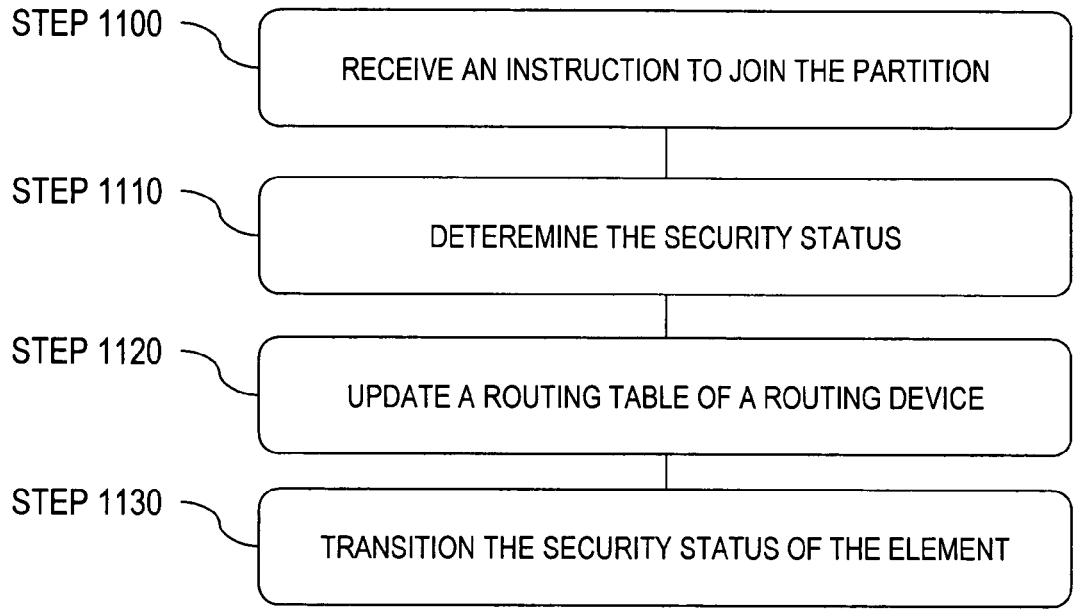
Figure 11B:
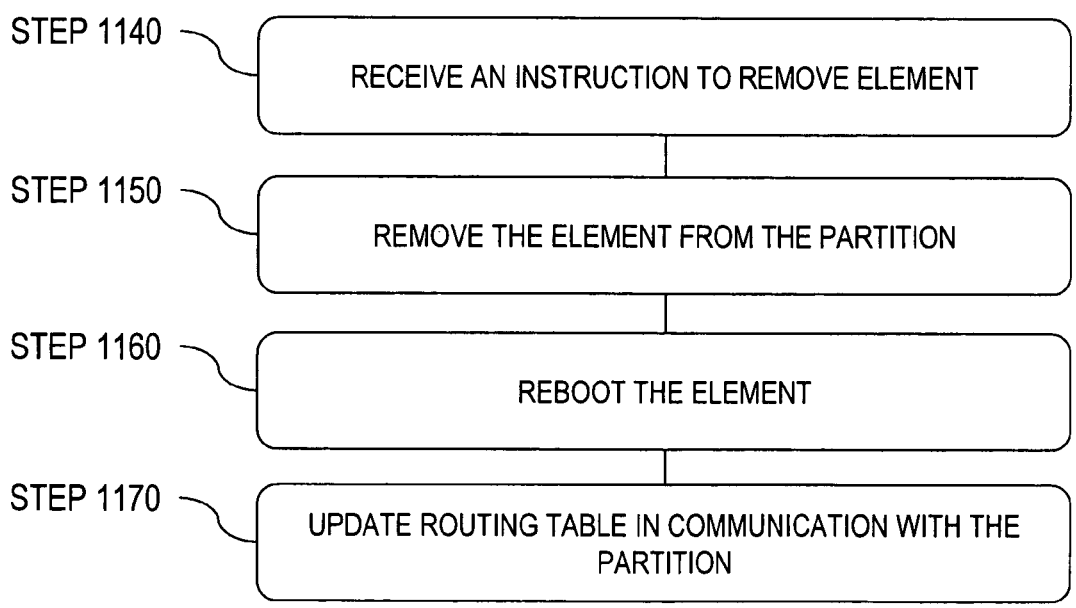
Figure 11C:
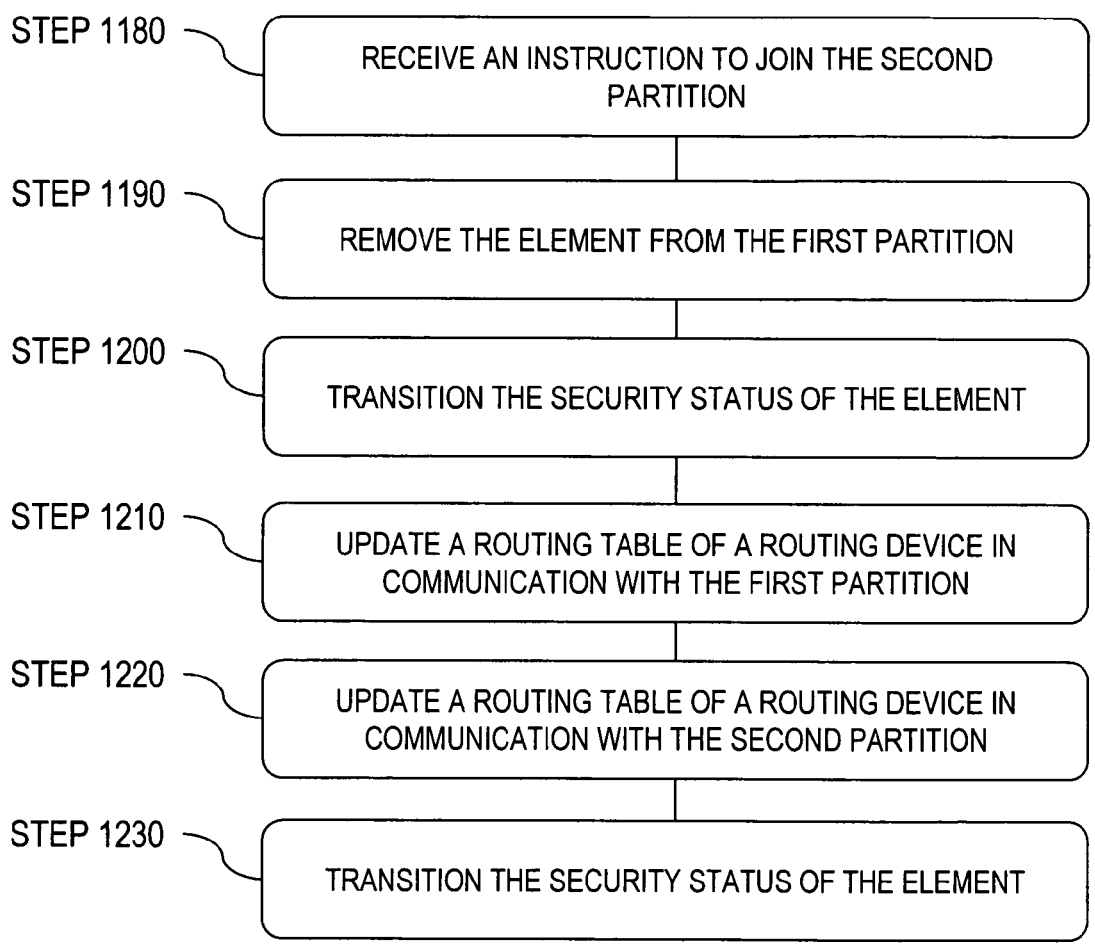

With reference to FIG. 10, in operation one of the CPUs 128 of the partition 116A forms a data packet that includes the source address of the packet and the destination address of the packet. The CPU 128 transmits the packet to the routing device 112. The routing device 112 receives the packet (STEP 1000). The routing device 112 reads the packet to determine the destination address (STEP 1010). A determination is made as to whether or not the destination address is configured to receive the packet (STEP 1020). In other words, the destination address is looked up in the routing table or bit mask 144 of the routing device 112 to determine if the destination address is part of the same partition 116 as the source address. The routing device 112 prohibits the transmission of the packet when the destination address is not allowed to receive the packet (STEP 1030). If the destination address is not found in the routing table of route enable mask 144 the packet is not transmitted. The packet can be dropped by the routing device 112. Additionally, the routing device 112 can notify the source address that the packet was not transmitted to the destination address (STEP 1040). The notification can cause the source address to transition into and error state. The error state can result the in the inoperability of the partition 116 that transmitted the packet. The source address can also generate a time out signal if the source address does not receive a notification from the destination address that the packet was received (STEP 1050). The partition 116 of the source address can transition into an error state after the time out signal has been generated. Once in an error state, the partition 116 can begin automatic error recovery or generate a notification that can be received a system administrator and written to an error log.

One feature of a partitionable computing system is the ability to dynamically configure the system in response to the computational demands required. For example, a partition can initially include cell 104A, cell 104B, and cell 104C. If more computational resources are needed, cell 104D can be added to the partition. However, maintaining the security of the partition is a great concern. If cell 104D has been accessed by a malicious user, the malicious user may try to add cell 104D to an existing partition to thereby gain access to the other cells 104 of the partition and render the other cells 104 inoperable. As previously described, the routing devices 112 contain routing tables or route enable masks 144. In order for a cell 104 that is not part of the partition 116 to join the partition 116, the route enable mask 144 of the routing device 112 can be updated to include the new cell 104.

More specifically, with reference to FIGS. 1B, 11A, 11B, and 11C various methods for adding cells to, deleting cells from, and moving cells between partitions are described. A method of transitioning the security state of a cell 104 is also described. During the boot-up of the partitionable computing system 100', cell 104A, cell 104B, and cell 104C receive an instruction from secure firmware to form a partition 116. Initially, cell 104D is not part of the partition 116. Once the cells 104A, 104B, and 104C form the partition and begin to execute non-authenticated code (e.g., operating system code) the state machine 132 of each of the cells 104 transitions from the secure state to the unsecure state. Cell 104D remains in the secure state, because it has not executed non-authenticated code. During normal operation of the partition 116 it is determined additional computing resources are needed. At that time, cell 104D receives a command from an element of the partition 116 to join the partition 116 (STEP 1100). In response, the security status of cell 104D is determined (STEP 1110). This can be accomplished by accessing the register of the state machine 132 of cell 104D. If the security status of the cell 104D is secure, the route enable mask 144 of the routing device 112 is updated to include the destination address of cell 104D (STEP 1120). This may require adding the destination addresses of cells 104A, 104B, and 104C to the route enable mask 144D associated with port between cell 104D and the routing device 112 and updating the route enable masks 144A, 144B, and 144C associated with respective ports of the routing device 112 and the cells 104A, 104B, and 104C. After the route enable masks 144 are updated, cell 104D joins the partition 116 and can begin to execute non-authenticated code. The security status of the cell 104D transitions from secure to unsecure once cell 104D executes non-authenticated code (STEP 113D).

At a subsequent time, the partition 116 may no longer need the resources of cell 104D. If this occurs, cell 104D can be removed from the partition 116. Cell 104D can receive an instruction to remove itself from the partition (STEP 1140). Cell 104D is removed from the partition (STEP 1150). In order to update the route enable masks 144 of the routing device 112, cell 104D should be transitioned to the secure security state. This transition can be accomplished in many ways. For example, cell 104D can be rebooted (STEP 1160). Alternatively, cell 104D can execute a transition routine stored in secure, authenticated memory or cell 104D can receive and interrupt or directive instruction cell 104 to execute a routine stored in secure, authenticated memory. After cell 104D transitions to the secure security status, cell 104D can update the route enable masks 144 associated with each port of the routing device 144. Cell 104D does not have to update the route enable masks 144, because it is operating in the secure mode.

In order to move a cell 104 from one partition 116A to another partition 1161B, the partitionable computer system 100 executes both the deletion method and the addition method. For example, assume partition 116A includes the cells 104A, 104B, and 104C and the partition 116B includes the cells 104D and 104E. Cell 104C can receive an instruction to join the partition 1161B (STEP 1180). Cell 104C removes itself from the partition 116A (STEP 1190). Cell 104C transitions itself from the unsecure state to the secure state by, for example, rebooting or performing some other transition method (STEP 1200). After cell 104C transitions to the secure security status, cell 104C can update the route enable masks 144 associated with each port of the routing device 144. If more than one routing device 144 is used, the route enable masks 144 of each routing device 112 are updated. Cell 104C removes itself from each of the route enable masks 144 associate with the cells 104A and 104B of the partition 116A (STEP 1210). Cell 104C adds itself to the route enable mask 144 associated with each of the cells 104D and 104E of the partition 116B. Additionally, cell 104C updates the route enable mask 144C associated with cell 104C. Once cell 104C is added to the partition 116B, cell 104C transitions from the secure state to the unsecure state when cell 104C executes non-authenticated code (STEP 1220).

The specific steps described above can be programmed into a computer readable medium and stored within the paritionable computing system 100 or external to the system 100. In one embodiment, the instructions are included as part of the firmware of the partitionable computing system 100. The instructions can be written in any computing language that is understandable by the system 100. For example, the instructions can be written in a object oriented programming language such as C or C++. Alternatively, an extensible language can be used, such as XML or a low level assembly language.

As noted above, a variety of modifications to the embodiments described will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A method of denying a first partition of a partitionable computer system from establishing a communication link with a second partition of the partitionable computer system comprising:
   requesting by a computing element of one of the first partition and the second partition that the communication link be established at the first partition;
   receiving a response by the computing element from the first partition;
   requesting by the computing element that the communication link be established at the second partition;
   receiving a response by the computing element from the second partition; and
   denying the establishment of the communication link between the first and second partition when one of the first and second partitions responds to the request negatively.

2. The method of claim 1 wherein the denying comprises instructing a link controller of one of the first and second partitions to not enable the communication link.

3. The method of claim 1 wherein the denying further comprises writing the response of the first partition to a register of the first partition and writing the response of the second partition to a register of the second partition.

4. The method of claim 1 wherein the denying further comprises setting a link enable bit in each of the first partition and the second partition.

5. The method of claim 1 wherein the computing element comprises hardware.

6. The method of claim 1 wherein the computing element comprises computer instructions.

7. The method of claim 1 wherein the computing element is a state machine.

8. A method of establishing a communication link between a first partition of a partitionable computer system and a second partition of the partitionable computer system comprising:
   requesting by a computing element of one of the first partition and the second partition that the communication link be established at the first partition;
   receiving a response by the computing element from the first partition;
   requesting by the computing element that the communication link be established at the second partition;
   receiving a response by the computing element from the second partition; and
   establishing the communication link between the first and second partition when both of the first and second partitions respond to the request positively.

9. The method of claim 8 wherein the establishing comprises instructing a link controller of one of the first and second partitions to enable the communication link.

10. The method of claim 8 wherein the establishing further comprises writing the response of the first partition to a register of the first partition and writing the response of the second partition to a register of the second partition.

11. The method of claim 8 wherein the establishing further comprises setting a link enable bit in each of the first partition and the second partition.

12. The method of claim 8 wherein the computing element comprises hardware.

13. The method of claim 8 wherein the computing element comprises computer instructions.

14. The method of claim 8 wherein the computing element is a state machine.

15. A system for controlling communication between a first partition of a partitionable computer system and a second partition of the partitionable computer system comprising:
   a first link controller associated with the first partition;
   a second link controller associated with the second partition;
   a computing element configured to request the establishment at the first partition and to request the establishment at the second partition of a communications link between the first and second partitions.

16. The system of claim 15 wherein the computing element is further configured to instruct the first link controller and the second link controller to deny the establishment of the link when one of the first and second partitions responds to its respective request negatively.

17. The system of claim 15 wherein the computing element is further configured to instruct the first link controller and the second link controller to establish the link when both of the first and second partitions responds to its respective request positively.

18. The system of claim 15 further comprising:
   a first link enable register associated with the first partition; and
   a second link enable register associated with the second partition;
   wherein the computing element is further configured to write a result of the request to each of the first and second partitions to the respective link enable register of each partition.

19. The system of claim 18 wherein both of the first link enable register and second link enable register comprises a single bit register.

* * * * *

UNITED STATES PATENT AND TRADEMARK OFFICE
CERTIFICATE OF CORRECTION

PATENT NO.         : 7,444,681 B2                          Page 1 of 1
APPLICATION NO. : 10/756473
DATED                : October 28, 2008
INVENTOR(S)       : Mark Edward Shaw et al.

It is certified that error appears in the above-identified patent and that said Letters Patent is hereby corrected as shown below:

In column 8, line 58, delete "1161B" and insert -- 116B --, therefor.

In column 8, line 63, delete "1161B" and insert -- 116B --, therefor.

Signed and Sealed this

Third Day of March, 2009

JOHN DOLL
*Acting Director of the United States Patent and Trademark Office*